United States Patent [19]

Share et al.

[11] Patent Number: 5,563,214

[45] Date of Patent: Oct. 8, 1996

[54] AQUEOUS COMPOSITIONS CONTAINING POLYMERIZABLE SURFACTANT COMPOUNDS

[75] Inventors: Paul E. Share, Berwyn; Wallace H. Pippin, West Chester, both of Pa.

[73] Assignee: Henkel Corporation, Plymouth Meeting, Pa.

[21] Appl. No.: 287,760

[22] Filed: Aug. 9, 1994

[51] Int. Cl.$^6$ ............ C08L 39/04; C08L 41/00; C08L 35/00

[52] U.S. Cl. ............ 524/809; 524/817; 524/833; 526/263; 252/182.18

[58] Field of Search ............ 524/809, 817, 524/832, 833

[56] References Cited

U.S. PATENT DOCUMENTS

| | | | |
|---|---|---|---|
| Re. 29,131 | 2/1977 | Smith et al. | 260/77.5 |
| 4,215,195 | 7/1980 | Ponticello et al. | 430/496 |
| 4,247,673 | 1/1981 | Ponticello et al. | 526/263 |
| 4,346,231 | 8/1982 | Ponticello et al. | 526/263 |
| 4,390,401 | 6/1983 | Costanza | 204/159 |
| 4,814,514 | 3/1989 | Yokota et al. | 568/608 |
| 4,950,708 | 8/1990 | Hochstrasser | 524/728 |
| 5,138,027 | 2/1992 | Van Beck | 528/339.3 |

FOREIGN PATENT DOCUMENTS

| | | |
|---|---|---|
| 0053047 | 6/1982 | European Pat. Off. . |
| 0343477 | 11/1989 | European Pat. Off. . |
| 50-98484 | 8/1975 | Japan . |
| 51-30285 | 3/1976 | Japan . |
| 54-14431 | 2/1979 | Japan . |
| 56-29657 | 3/1981 | Japan . |
| 56-28208 | 3/1981 | Japan . |
| 56-127697 | 10/1981 | Japan . |

OTHER PUBLICATIONS

Tech Bulletin TREMLF40: Reactive Anionic Surfactant for Emulsion Polymerization (Henkel Corporation, Ambler, PA.

Encyclopedia of Chemical Technology, vol. 2, pp. 252–258, (Kirk–Othmer, eds., John Wiley & Sons, New York, New York, 1978.

Encyclopedia of Chemical Technology, vol. 2, pp. 67 and 68, (Kirk–Othmer, eds., John Wiley & Sons, New York, New York, 1978.

Encyclopedia of Chemical Technology, vol. 2, pp. 795 and 803–806, (Kirk–Othmer, eds., John Wiley & Sons, New York, New York, 1978.

Encyclopedia of Chemical Technology, vol. 12, pp. 319–321, (Kirk–Othmer, eds., John Wiley & Sons, New York, New York, 1980.

Encyclopedia of Chemical Technology, vol. 9, pp. 306–308, (Kirk–Othmer, eds., John Wiley & Sons, New York, New York, 1980.

Encyclopedia of Polymer Science and Technology, vol. 11, pp. 476–489, John Wiley & Sons, New York, New York, 1988.

Encyclopedia of Polymer Science and Technology, vol. 6, pp. 225–322, Jon Wiley & Sons, New York, New York, 1986.

G. Poehlein, "Emulsion Polymerization,"Encyclopedia of Polymer Science and Technology, vol. 6, pp. 1–51, John Wiley & Sons, 1986.

Encyclopedia of Polymer Science and Engineering, vol. 1, pp. 169–211, John Wiley & Sons, 1985.

Chemical and Pharmaceutical Bulletin, issued 1984, Shiozawa et al., "Antivertigo Agents. IV, Synthesis and Antivertigo Activity of 6-[-Aryl-1-piperazinyl) alkyl-5,6, 7, 8, -tetrahkydor-1, 6naphthyridines", pp. 3981–3993.

Encyclopedia of Polymer Science and Engineering, vol. 3, pp. 552–671, and supplemental vol. pp. 53, 109 & 110, John Wiley & Sons, 1985.

"Specifications and Characteristics of Emery Chemicals", Technical Bulletin 100F, Henkel Corporation, Emery Group, p. 5, USA,1990.

*Primary Examiner*—Joseph L. Schofer
*Assistant Examiner*—Wu C. Cheng
*Attorney, Agent, or Firm*—Wayne C. Jaeschke; John D. Wood; Daniel S. Ortiz

[57] ABSTRACT

Aqueous compositions comprised of a major amount of water and a minor amount of a polymerizable compound based on N-acryloyl-piperazine are provided. Such compounds have the formula:

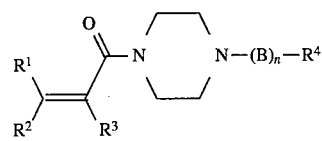

wherein:

$R^1$, $R^2$, and $R^3$ are each independently selected from the group consisting of hydrogen and lower alkyl, B is a linking group selected from the group consisting of carbonyl, sulfonyl, amide, and carboxyl;

n is one or zero;

$R^4$ is a radical selected from the group consisting of a higher aliphatic group (i.e. at least four carbon atoms, preferably from about 6 to about 50 carbon atoms), a substituted higher aliphatic group, an alicyclic group, a heterocyclic group, a non-benzenoid aromatic group, and a substituted aromatic group. These compounds can be used as an emulsifier in emulsion polymerization.

15 Claims, No Drawings

AQUEOUS COMPOSITIONS CONTAINING POLYMERIZABLE SURFACTANT COMPOUNDS

FIELD OF THE INVENTION

The present invention relates to aqueous compositions comprised of polymerizable surfactant compounds and to the use of such polymerizable surfactant compounds in emulsion or suspension polymerization.

BACKGROUND OF THE INVENTION

A variety of surfactants having emulsifying, dispersing, detergent, wetting, foaming and other properties have been used in various products including textile materials, rubber and plastic products, pesticides, metals, paints, pigments, construction materials and the like while utilizing such properties. Efforts have been made to obtain better acceptance of such products among end users by using a suitable surfactant. As a result of such activities, certain defects associated with the use of conventional surfactant have been revealed.

For instance, the use of certain surfactants is indispensable for the manufacture, stabilizing or workability of paints, printing inks, adhesives and the like. After these products have been used in painting, printing, bonding or other applications, not only is the presence of such surfactants not necessary but often adversely affects the water resistance, oil resistance or other properties of the resultant films or layers. As a countermeasure of these problems, various approaches have been studied including the reduction of the quantity of surfactant or the use of a surfactant having a large molecular weight. However, they are not compatible with the storage stability and/or workability of products to be imparted by the surfactant.

Surfactants are used in the emulsion or suspension polymerization of monomers for the production of water-based polymer emulsions or suspensions. Examples of surfactants which have been used for such applications include anionic surfactants such as alkyl sulfates, alkylbenzenesulfonates, dialkylsulfosuccinates and polyoxyalkylene alkyl (or aryl) ether sulfates; and nonionic surfactants such as polyoxyalkylene alkyl (or aryl) ethers, polyoxyethylenepolyoxypropylene block copolymers and polyoxyethylenesorbitan fatty acid esters. These surfactants may be used either singly or in combination. However, polymer emulsions and films formed therefrom including these conventional surfactants are far from complete satisfaction with respect to emulsion stabilities and film properties. Thus, many problems still remain unsolved including the polymerization, mechanical, chemical, freeze and storage stabilities and the pigment dispersing property of resultant polymer emulsions incorporating conventional emulsifiers. When films are formed from these polymer emulsions, the water resistance and adhesion thereof are often impaired by the presence of unbound surfactants in the films. When these emulsions are destroyed by means of, for example, salting out to recover polymer particles therefrom, a large amount of waste liquid containing the surfactant are necessarily formed as a by-product. For environmental reasons, this liquid must be subjected to expensive and complicated on-site water-treating processes before it can be disposed as effluent.

A number of patent documents disclose a novel type of surfactant which are polymerizable, degradable or otherwise reactive during or after use so as to be free from the foregoing defects. Examples of Japanese patent documents describing reactive anionic surfactants are listed as follows: Patent Application Nos. 46-12472, 46-34894, 49-46291, 56-29657, and Laid Open Application 51-30285, 54-14431, and 56-127697. Examples of Japanese patent documents describing reactive nonionic surfactants include Laid Open Applications Nos. 50-98484 and 56-28208.

U.S. Pat. No. 4,814,514 (Yokota et al.) discloses compounds prepared by the reaction of a glycidyl (meth)acrylate with a hydroxyalkylated polyalkyleneoxy fatty alcohol followed by reaction with an alkylene oxide and the use of these compounds as an emulsifier in the emulsion or dispersion polymerization of ethylenically unsaturated monomers.

U.S. Pat. No. 4,390,401 (Costanza) discloses the use of acrylate or methacrylate esters of polyalkylene oxide derivatives of alkyl/aryl phenols as wetting agents and adhesion promoters in ultraviolet curable systems. Compositions based on alkylene oxide derivatives may contain lower hydroxyalkyl compounds which can contribute measurably to the VOC (volatile organic compound) content of the composition.

A technical bulletin entitled "TREM LF-40: Reactive Anionic Surfactant for Emulsion Polymerization", Henkel Corporation, Ambler, Penn., states that TREM LF-40 is a sodium alkyl allyl sulfosuccinate with a reactive group in its molecule that will copolymerize with monomers via free radical polymerization. It is stated that the product, when used as a primary or secondary emulsifier, provides low foaming emulsions with improved water resistance.

SUMMARY OF THE INVENTION

This invention relates to aqueous compositions comprised of a major amount of water and a minor amount of a polymerizable compound of the formula:

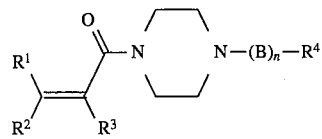

wherein:
R¹, R², and R³ are each independently selected from the group consisting of hydrogen and lower alkyl, B is a linking group selected from the group consisting of carbonyl, sulfonyl, amide, and carboxyl;

n is one or zero;

R⁴ is a radical selected from the group consisting of a higher aliphatic group (i.e. at least four carbon atoms, preferably from about 5 to about 50 carbon atoms), a substituted higher aliphatic group, an alicyclic group, a heterocyclic group, a non-benzenoid aromatic group, and a substituted aromatic group (said substituted aromatic group preferably having a higher aliphatic group or a substituted higher aliphatic group as substituents, e.g. an alkyl group, an alkaryl group, an aralkyl group, an alkoxy group, an alkaryloxy group, or an aralkoxy group, each having at least four carbon atoms). R⁴ is preferably comprised of a hydrophobic group, e.g. a hydrocarbon-based group having at least six, preferably at least eight, and more preferably at least 12 carbon atoms and preferably no polar functional groups (e.g. hydroxyl groups or ethyleneoxy groups). In particularly preferred embodiments, R⁴ is comprised of a hydrocarbon radical having at least 12 carbon atoms and no other functional groups bonded to any of the intermediate carbon atoms thereof (i.e. those carbon atoms bonded to at least two other carbon atoms of the hydrocarbon radical).

A preferred class of polymerizable compounds within the scope of this invention have the formula II:

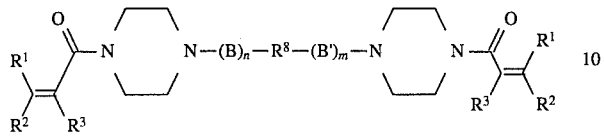

wherein each $R^1$, $R^2$, and $R^3$ is independently selected from the group consisting of hydrogen and lower alkyl, each B and B' linking group is independently selected from the group consisting of carbonyl, sulfonyl, amide, and carboxyl;

n and m are independently one or zero;

$R^8$ is a is a divalent radical selected from the group consisting of an aliphatic group, an alicyclic group, an aromatic group, and a heterocyclic group (preferably a higher alkylene group (i.e. at least four carbon atoms, preferably from about 5 to about 50 carbon atoms), a substituted higher alkylene group, an aryl group (preferably a phenyl group), an aralkyl group, and an alkaryl group. $R^8$ is preferably a hydrophobic group, e.g. a hydrocarbon-based group having at least six, preferably at least eight, and more preferably at least 12 carbon atoms and preferably no polar functional groups (e.g. hydroxyl groups or ethyleneoxy groups). In particularly preferred embodiments, $R^8$ is comprised of a hydrocarbon radical having at least 12 carbon atoms and no other functional groups bonded to any of the intermediate carbon atoms thereof (i.e. those carbon atoms bonded to at least two other carbon atoms of the hydrocarbon radical).

Another special class of polymerizable compounds within the scope of this invention have the following formula III:

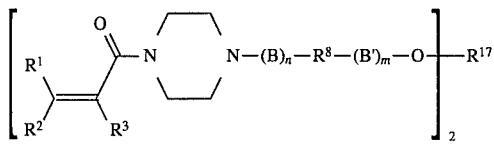

wherein the variables have the same meaning as set forth above and $R^{17}$ is a polyvalent radical selected from the group consisting of an aliphatic group, an alicyclic group, an aromatic group, and a heterocyclic group (preferably an alkylene group, a substituted alkylene group, an aralkyl group, a substituted aralkyl group, an alkyleneoxyalkyl group, a substituted alkyleneoxyalkyl group, an alkyleneoxyaralkyl group, a substituted alkyleneoxyaralkyl group).

Particularly preferred polymerizable compounds useful in this invention are those wherein n is one (and B is preferably a carbonyl group) and $R^4$ is an alkylene-amido group having the structure $—R^8—C(O)—N(R^9)—R^{10}$ or an alkylene-ester group having the structure $—R^8—C(O)—O—R^{11}$, wherein $R^8$ is a divalent group selected from the group consisting of a higher alkylene group, a substituted higher alkylene group, an aromatic group, and a substituted aromatic group (e.g. as set forth above), and $R^9$, $R^{10}$, and $R^{11}$ are independently selected from the group consisting of an aliphatic group, an alicyclic group, an aromatic group, and a heterocyclic group (preferably an alkyl group, a substituted alkyl group, an alkenyl group, a substituted alkenyl group, an aromatic group, and a substituted aromatic group), provided that $R^9$ and $R^{10}$ may together form a divalent alicyclic or heterocyclic radical, e.g, wherein $R^4$ has the formula IV:

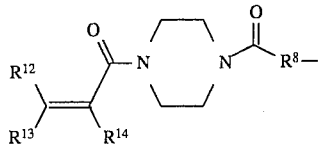

wherein $R^{12}$, $R^{13}$, and $R^{14}$ are independently selected from the group consisting of hydrogen and lower alkyl.

This invention also relates to a method of polymerization comprising polymerizing a minor amount of a polymerizable compound of formula I, above, in the presence of a major amount of water. In preferred methods, said compound is polymerized in the presence of one or more ethylenically unsaturated monomers other than said polymerizable compound and said polymerizable compound is preferably present in a minor amount on a mole percent basis of all of the monomers of said polymerizable composition.

DETAILED DESCRIPTION OF THE INVENTION

This invention relates to aqueous compositions which are comprised of polymerizable compounds of formula I and to methods of polymerization which employ these polymerizable compounds. These compounds are piperazine derivatives in which one of the amine nitrogen atoms of the piperazine molecule has been reacted with an acylating agent to introduce the acrylamido group (or a homologue thereof) which contains the groups $R^1$, $R^2$, and $R^3$, and in which the other piperazine nitrogen atom has been reacted with a compound to introduce the $R^4$ group (and optionally a B linking group) into the molecule. Thus, one of the starting materials for preparing the polymerizable compounds useful in this invention is piperazine, or a derivative thereof (e.g. an amide that is susceptible to transamidation).

The group $R^4$ is an aliphatic, substituted aliphatic, non-benzenoid aromatic, or substituted aromatic radical having at least four carbon atoms from 4 to about 50 carbon atoms. Such aliphatic radicals include any (a) straight chain and branched alkyl radicals having from 4 to about 50 carbon atoms; (b) cycloalkyl radicals having from 4 to about 20 carbon atoms; (c) straight chain and branched alkenyl radicals having from 4 to about 40 carbon atoms; (d) cycloalkenyl radicals having from 5 to about 20 carbon atoms; (e) straight chain and branched alkynyl radicals having from 4 to about 30 carbon atoms; cycloalkynyl radicals having from 6 to about 20 carbon atoms. Aliphatic radicals also include those above-mentioned aliphatic radicals which contain one or more heteroatoms substituted for one or more hydrogen or carbon atoms. The heteroatoms include the halogens, nitrogen, sulfur, oxygen, and phosphorus or groups of heteroatoms such as nitro, sulfonic acid, $C_{1-10}$ alkyl sulfonate ester, sulfoxide, sulfone, phosphoryl, trihalomethyl, and the like.

An aromatic radical is any benzenoid or non-benzenoid aromatic radical having a valence of 2 to 8. A non-benzenoid aromatic radical excludes simple phenyl groups, but includes aromatic, polynuclear aromatic, other carbocyclic aromatic radicals (e.g. those having cycloaliphatic groups), and heterocyclic aromatic radicals. For purposes of this invention, a substituted aromatic radical is any benzenoid or non-benzenoid aromatic radical having a valence of from 2 to 6 wherein one or more hydrogen atoms is replaced by an atom or a group of atoms other than hydrogen including the alkyl, alkenyl, alkoxy, halogens, nitrogen, sulfur, oxygen, and phosphorus or groups of heteroatoms such as nitro, sulfonic acid, $C_{1-10}$ alkyl sulfonate ester, sulfoxide, sulfone, phosphoryl, trihalomethyl, and the like. Such an aromatic radical also includes those radicals which contain other aliphatic moieties, aromatic groups, and/or hetero atoms.

In preferred embodiments, $R^4$ has at least seven carbons and, in more preferred embodiments, is ethylenically unsaturated. This ethylenic unsaturation should be copolymerizable with the acrylamido group defined by $R^1$, $R^2$, and $R^3$, e.g. an acrylamido group. The size of the group will affect the physical properties of a polymer prepared therefrom such that a larger $R^4$ group will impart different physical properties than a smaller group. For example, a higher alkyl group as (or part of) the $R^4$ group will tend to impart greater flexibility to the polymer.

The B linking group, if present, is introduced into the molecule by the derivatization of one of the piperazine nitrogen atoms. The B linking group is a carbonyl, sulfonyl, amide, or carboxyl group, i.e. a group having the respective formula:

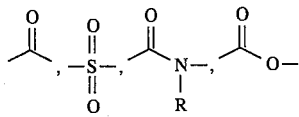

In each respective case, the compound will then have at that piperazine nitrogen atom an amide functionality, a sulfonamide functionality, a substituted-urea functionality, or a urethane functionality. Because the piperazine nitrogen atom can be covalently bonded to the $R^4$ group directly, a B linking group may not be present and, thus, n may be zero (in which case there will be a tertiary amine functionality at that piperazine nitrogen atom).

To prepare the compounds of this invention, piperazine is reacted with two different derivatizing agents, the identity of each being determined by the desired structures of $R^1$, $R^2$, and $R^3$, and $R^4$ (and the B linking group, if present), and the leaving group (if any) in these derivatization reactions. Thus, one of the derivatizing agents will have the following formula VI:

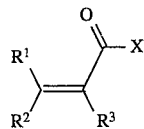

wherein $R^1$, $R^2$, and $R^3$ are as defined above and X is a leaving group (e.g. a halogen such as chlorine or another displacable anion-forming atom or group, e.g. a carboxylate group when the acylating agent is an acid anhydride). The other agent will have the formula VII:

wherein $R^4$ is as defined above and X' is a leaving group (e.g. as set forth above). Of course, when the derivatizing agent is an isocyanate, i.e. that used to form a substituted-urea functionality, there is no "leaving group" as such in the strictest sense because the nitrogen atom of the isocyanate reactant, does not leave the molecule.

The reactions of the piperazine compound and the derivatizing agents may be conducted sequentially or simultaneously, depending on whether the two acylating agents are compatible. In a simultaneous reaction, both agents will be mixed with the piperazine compound under conditions which will cause the reaction to proceed as follows in scheme 1:

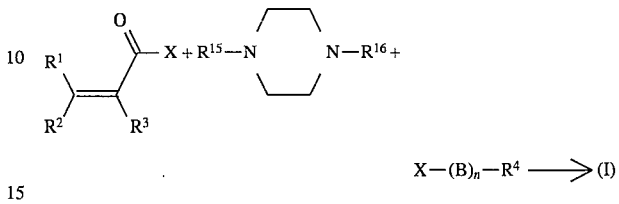

wherein $R^1$, $R^2$, $R^3$, $R^4$, X and X' are as defined above.

If one of the derivatizing agents has a higher reactivity for piperazine than the other derivatizing agent and this higher reactivity cannot be practically compensated for (e.g. by adjusting the ratio of derivatizing agents in the reaction mixture), or if the derivatizing agents will react with each other to any degree that will provide an unacceptable by-product (e.g. if $R^8$ contains a hydroxyl or amine group susceptible to acylation), then the reactions will be performed sequentially. For example, if $R^8$ contains a hydroxyl or amine function, then a reaction sequence according to scheme 2 may be employed:

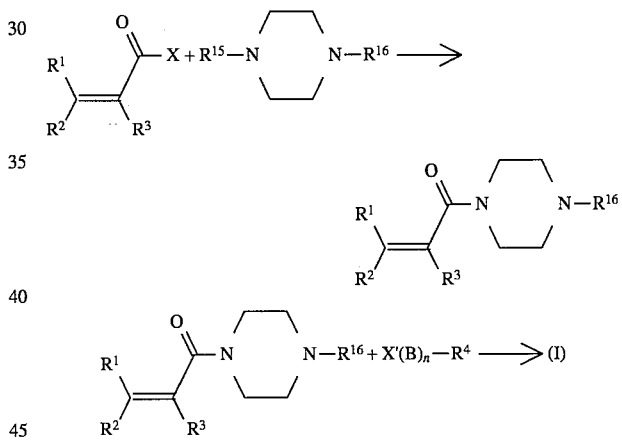

wherein $R^{15}$ and $R^{16}$ are hydrogen or an organic group susceptible of displacement in the acylating reaction and the other groups are as defined above.

The reaction to introduce the acrylamide functionality into the molecule is an acylation reaction. Acylation techniques for amide formation are generally described in *Encyclopedia of Chemical Technology*, vol. 2, pp. 252–258 (Kirk-Othmer, eds., John Wiley & Sons, Inc., New York, N.Y., 1978), the disclosure of which is incorporated by reference. In the acylation of an amine, an acylating compound of the desired molecular formula with a leaving group is reacted with the amine compound. For example, an carboxylic acid, acid anhydride or acid halide (e.g., chloride, of acrylic or methacrylic acid) is reacted with the amine, or derivative thereof, optionally in the presence of a catalyst, e.g. N,N-dimethylaminopyridine. When the carboxylic acid form of the acylating agent (i.e. leaving group is a hydroxyl group) is used, a strong acid catalyst, e.g. p-toluenesulfonic acid, is typically employed.

The reaction is typically accomplished in an inert solvent, but the catalyst or one of the reactants may also act as a solvent. Because piperazine is hydrophilic, but the reaction product tends to be less so, the choice of solvent and reaction conditions can affect the efficiency of the reaction. Generally, it has been found that an organic solvent having a greater polarity than an aromatic solvent (e.g. toluene) is preferred, for example, a mixture of acetonitrile and dichloromethane (e.g. 1:1 by volume) is a preferred solvent.

Because piperazine is a secondary amine, an acylating agent with a more labile leaving group (e.g. an acid halide wherein the leaving group is a halogen anion such as chloride) is preferred. With such a leaving group, a hydrohalic acid (e.g. hydrochloric acid) is a by-product of the reaction, and thus, an alkaline material should be added to the reaction mixture to neutralize by-product acid. It has been found that inorganic alkaline materials, e.g. alkali metal carbonates, are less preferred due to problems associated with product isolation and that lower alkyl tertiary amine bases (having the formula $NR^1R^2R^3$ wherein $R^1$, $R^2$, and $R^3$ are independently $C_1$ to $C_4$ alkyl, e.g. triethylamine) are useful in neutralizing acid formed during an acylation reaction which employs an acyl halide as the acylating agent.

It should also be noted that when an ester functional compound of formula III is prepared as a result of the use of an anhydride as an acylating agent (e.g. when phthalic anhydride is used as an acylating agent to introduce the $R^4$ group into the molecule), the leaving group will be a carboxyl anion that is covalently bonded to $R^8$. Thus, the carboxyl group must, in this case, be esterified to introduce the $R^{11}$ group into the molecule. Conventional esterification techniques which employ an alcohol having the formula $R^{11}$—OH, or an ester thereof that is susceptible to transesterification, will be useful to esterify the carboxyl anion that is created upon the opening of the anhydride linkage. Alternatively, the alcohol $R^{11}$—OH can be reacted with an anhydride to prepare an intermediate that has both ester and carboxyl functionality. The carboxyl functionality of this intermediate can then be used as an acylating agent in schemes 1 and 2. If the alcohol $R^{11}$—OH is a polyol, then the reaction of a molar amount of the anhydride equal to the polyol functionality can be used to prepare an intermediate that has sufficient carboxyl functionality to introduce a piperazine functionality into the molecule that is equal to the polyol functionality, followed by reaction of the n-functional piperazine intermediate with a derivatizing agent of formula VI to introduce one or more ethylenic unsaturations into the molecule, i.e. as set forth in the following scheme:

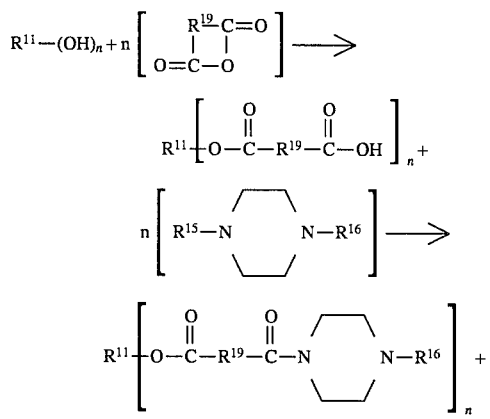

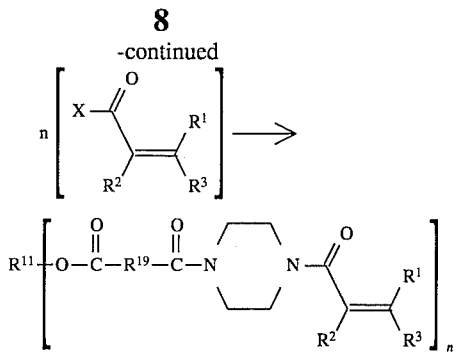

wherein $R^{19}$ is the residue of an organic dicarboxylic acid anhydride.

Examples of the anhydrides that can be used as an acylating agent (or half-esters thereof) include substituted succinic anhydrides which are preferred due to their low viscosity at room temperature. The low viscosity at room temperature leads to advantages in the final product (i.e. liquid final products) as well as in the synthetic procedure (i.e. a stirrable liquid that can serve as a reactant and thus provide a liquid reaction medium without the addition of a solvent). Preferred substituted succinic anhydrides are the alkyl- or alkenyl-substituted succinic anhydrides, e.g. n-octenyl succinic anhydride, n-nonenyl succinic anhydride, dodecenyl succinic anhydride, and iso-octadecenyl succinic anhydride.

The choice of the reactant X—$(B)_n$—$R^4$ will determine the nature of the B linking group that is introduced into the molecule. When there is no B linking group, the reactant will typically be an alkyl halide or an aryl alkaline earth metal halide (e.g. the Grignard reagent phenyl magnesium bromide). Alkylation of amines is discussed in *Encyclopedia of Chemical Technology*, vol. 2, pp. 67 and 68 (Kirk-Othmer, eds., John Wiley & Sons, Inc., N.Y., N.Y., 1978), the disclosure of which is incorporated by reference. When the B linking group is a carbonyl group, the reactant will typically be an acid halide and the product can be characterized as a acylamide. Acylation reactions are discussed in *Encyclopedia of Chemical Technology*, vol. 2, pp. 252–258 (Kirk-Othmer, eds., John Wiley & Sons, Inc., New York, N.Y., 1978), the disclosure of which is incorporated by reference. When the B linking group is a sulfonyl group, the reactant will typically be a sulfonyl halide and the product can be characterized as a sulfonamide. The reaction to form a sulfonamide is very similar to an acylation reaction. The synthesis of sulfonamides is discussed in *Encyclopedia of Chemical Technology*, vol. 2, pp. 795 and 803–806 (Kirk-Othmer, eds., John Wiley & Sons, Inc., New York, N.Y., 1978), the disclosure of which is incorporated by reference.

As discussed above, when the B linking group is an amide, the reactant will typically be an isocyanate. The synthesis of urea compounds by the reaction of an amine with an isocyanate is discussed in *Encyclopedia of Chemical Technology*, vol. 12, pp. 319–321 (Kirk-Othmer, eds., John Wiley & Sons, Inc., New York, N.Y., 1980), the disclosure of which is incorporated by reference.

Further, when the B linking group is a carboxylate group such that the compound has a urethane functionality, a reaction sequence as shown in scheme 3, below will be useful:

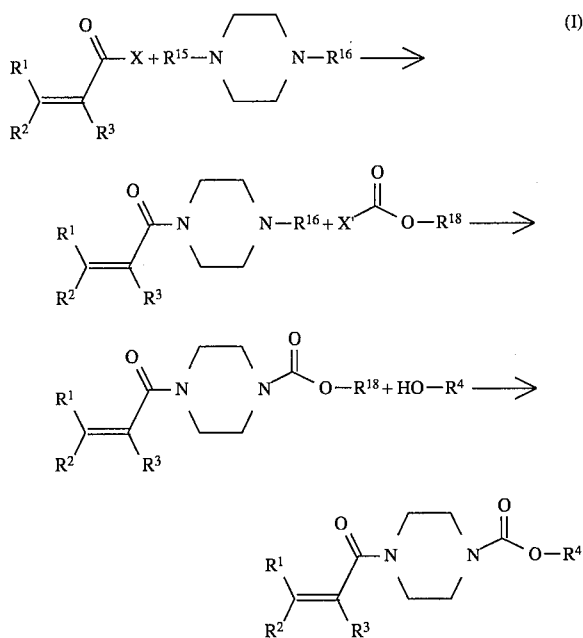

wherein all of the variables are as set forth above and $R^{18}$ is a group susceptible to transesterification, e.g. an alkoxy group or an aryloxy group, preferably lower alkoxy (e.g. a methoxy group). Transesterification reactions are generally known. They are typically catalyzed by a base (e.g. alkali) or an acid and are governed by principles of mass transfer so that the reaction can be driven to substantial completion by removal of the by-product alcohol $R^{18}$ —OH (e.g. by distillation). Transesterification reactions are discussed in *Encyclopedia of Chemical Technology*, vol. 9, pp. 306-308 (Kirk-Othmer, eds., John Wiley & Sons, Inc., New York, N.Y., 1980), the disclosure of which is incorporated by reference.

In the special case where $R^4$ has the formula IV, i.e. there are two piperazine groups in the molecule, it is convenient to employ the following scheme 4 to prepare the compound:

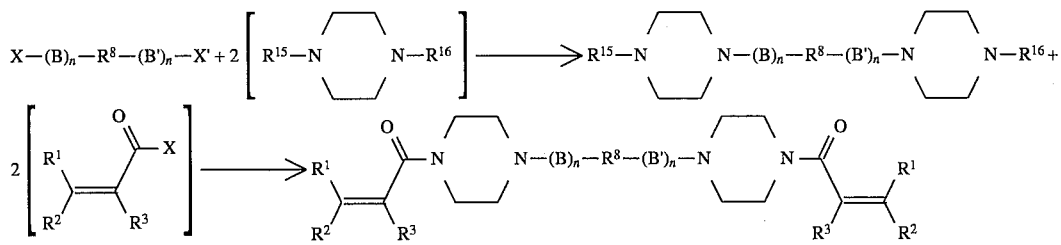

wherein the groups are selected as set forth above. It should be noted that the $R^1$, $R^2$, and $R^3$ groups on each end of the molecule need not be the same, i.e. if, for example, a mixture of acryloyl chloride and methacryloyl chloride are used to acylate the di-piperazine intermediate in scheme 4 above, the $R^1$, $R^2$, and $R^3$ groups on one end of the molecule will differ from the $R^1$, $R^2$, and $R^3$ groups on the other end of the molecule. The $R^8$ group is derived from a di-carboxylic acid compound, preferably a di-carboxylic acid having a higher alkylene group between the acid groups, or a reactive derivative thereof, e.g. an anhydride, an acid halide, or transesterifiable ester thereof. Examples of diacids include aliphatic diacids, e.g. succinic acid and substituted succinic acids (as described below, and aromatic diacids, e.g. phthalic acid. Preferred diacids having a higher alkylene chain are described in *Encyclopedia of Polymer Science and Technology*, vol. 11, pp. 476–489, (John Wiley & Sons, Inc. New York, N.Y., 1988), the disclosure of which is incorporated herein by reference. Such preferred diacids include dimer acids (produced by the dimerization of fatty acids which yields an $R^8$ group in which is a divalent hydrocarbon, e.g. oleic acid which produces a divalent hydrocarbon having 36 carbon atoms), tridecanedioc acid (produced by the ozonolysis of erucic acid), $C_{19}$ diacid (produced by the hydroformylation of oleic acid with carbon monoxide) and $C_{21}$ diacid (produced by the reaction of tall oil fatty acid with acrylic acid). The preferred diacids are dimer acids. Dimer acids are also described in detail in U.S. Pat. No. 5,138,027 (Van Beek), the disclosure of which is incorporated herein by reference. The compounds of formula II can be considered compounds of formula I wherein $R^4$ is a substituted aliphatic group, e.g. when $R^8$ is derived from a dimer acid such that $R^4$ is a higher alkyl group substituted with an acrylamido-piperazinyl-carbonyl group.

In the special case of compounds of formula III, i.e. there are two piperazine groups in the molecule and an $R^{17}$ group, it is convenient to employ the following scheme 5 to prepare the N,N'-diacylamido-piperazine compound:

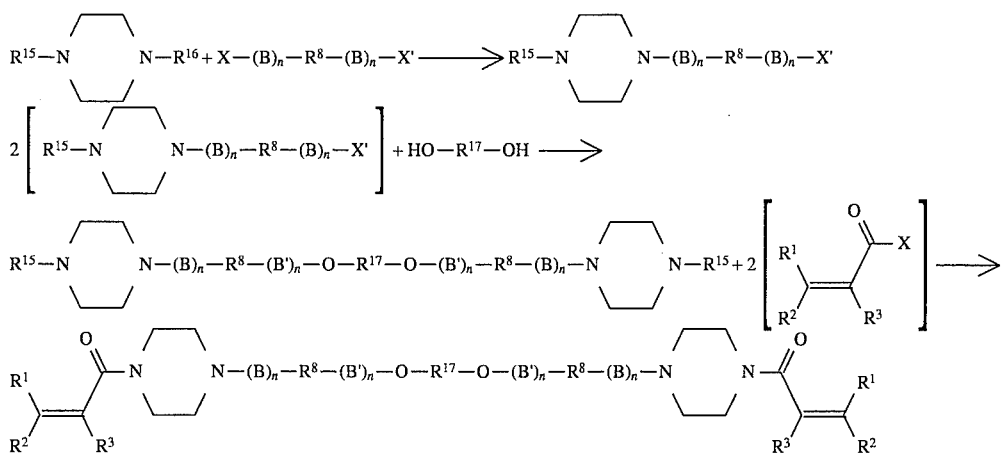

wherein the groups are selected as set forth above. It should be noted that the $R^1$, $R^2$, and $R^3$ groups on each end of the molecule need not be the same; if, for example a mixture of acryloyl chloride and methacryloyl chloride are used to acylate the di-piperazine intermediate in scheme 5 above, the $R^1$, $R^2$, and $R^3$ groups on one end of the molecule will differ from the $R^1$, $R^2$, and $R^3$ groups on the other end of the molecule. The reactant HO—$R^{17}$—OH is a polyol reactant. Examples of polyols are polyalkyleneoxy compounds, e.g. those described in *Encylcopedia of Polymer Science and Technology*, vol. 6, pp. 225–322 (John Wiley & Sons, Inc., New York, N.Y. 1986), the disclosure of which is incorporated herein by reference. Preferred polyols are alkyleneoxyalkyl or alkyleneoxyaralkyl compounds having at least two free hydroxyl groups. Examples of alkyleneoxyalkyl compounds are ethoxylated and/or propoxylated lower alkane polyols, e.g. propoxylated trimethylolpropane (e.g. Photonol PHO-7072), ethoxylated trimethylolpropane (e.g. Photonol PHO-7149, Photonol PHO-7155, and Photonol PHO-7158), propoxylated glycerol (e.g. Photonol PHO-7094), propoxylated neopentylglycol (e,g. Photonol PHO-7127), and ethoxylated neopentylglycol (e.g. Photonol PHO-7160). Examples of alkyleneoxyaralkyl compounds are ethoxylated and/or propoxylated alkylpolyphenols, e.g propoxylated bisphenol A (e.g. Photonol PHO-7020) and ethoxylated bisphenol A (e.g. Photonol PHO-7025, and Photonol PHO-7028). All of these Photonol products are available commercially from Henkel Corporation, Ambler, Penn.

The compositions of this invention are comprised of a minor amount by weight of the polymerizable compounds of this invention and a major amount by weight of water. The amount of the polymerizable compound will typically range from about 0.05 to about 20%, preferably from about 0.1 to about 5% by weight of the total aqueous composition. The polymerizable compound is preferably used in an amount greater than the critical micelle concentration (CMC) of the polymerizable compound. The critical micelle concentration of the polymerizable compound can be found by conventional means, e.g. Traube's method. (The CMC of a surfactant is typically defined as the concentration at which additional amounts of surfactant when added to water change the surface tension at the air/water interface only slightly if at all. The surface tension at the air/water interface ceases to change significantly because the concentration of the surfactant away from the air/water interface is sufficient to permit the surfactant to form micelles.)

The preparation of aqueous dispersions of polymers by emulsion polymerization for use in various applications is well known in the art. The practice of emulsion polymerization is discussed in detail in G. Poehlein, "Emulsion Polymerization", *Encyclopedia of Polymer Science and Technology*, vol. 6, pp. 1–51 (John Wiley & Sons, Inc. New York, N.Y., 1986), the disclosure of which is incorporated herein by reference. Conventional emulsion polymerization techniques may be used to prepare the aqueous dispersion of polymers of this invention.

The other polymerizable components useful in this invention are any materials which are capable of addition copolymerization with the polymerizable compounds of formula I described above to form a useful polymer composition. The polymerization of acrylamide monomers is discussed in *Encyclopedia of Polymer Science and Engineering*, vol. 1, pp. 169–211 (John Wiley & Sons, Inc., New York, N.Y., 1985), the disclosure of which is incorporated by reference. The polymerizable components include mono-ethylenically unsaturated monomers capable of homopolymerization, or copolymerization with other ethylenically unsaturated monomers, as well as copolymerization with the polymerizable compound. Examples of suitable mono-ethylenically unsaturated compounds include alkyl acrylates, alkyl methacrylates, acrylamides (e.g. lower N-alkyl acrylamides), maleic anhydride, maleates, itaconates, allyl ethers, allyl esters, vinyl halides, vinyl esters, vinyl amines and vinyl aromatic compounds. Specific examples include ethyl acrylate, t-butyl acrylate, 2-ethylhexyl acrylate, methyl methacrylate, lauryl methacrylate, vinyl chloride, vinyl acetate, N-vinyl pyrrolidinone, styrene, and vinyl toluene.

Further useful monomers include the vinylidene halides, vinyl halides, acrylonitrile, methacrylonitrile, vinyl esters such as vinyl formate, vinyl acetate and vinyl propionate, and mixtures of ethylene and such vinyl esters, acrylic and methacrylic acid esters of alcohol ethers such as diethylene glycol monoethyl or monobutyl ether methacrylate, $C_1$–$C_{10}$alkyl esters of beta- acryloxypropionic acid and higher oligomers of acrylic acid, styrene and alkyl substituted styrenes and vinyl aromatics including alpha-methyl styrene, mixtures of ethylene and other alkylolefins such as propylene, butylene, pentene and the like, vinyl ethers such as methyl vinyl ether, ethyl vinyl ether, vinyl 2-methoxyethyl ether, vinyl 2-chloroethyl ether and the like. Additional monoethylenically unsaturated polymerizable comonomers that may be useful in preparing the polymer of the invention include hydroxy functional vinyl monomers such as 2-hydroxyethyl methacrylate, 2-hydroxyethyl acrylate, 3-hydroxypropyl methacrylate, butanediol acrylate, 3-chloro-2-hydroxypropyl acrylate, 2-hydroxypropyl acrylate, and 2-hydroxypropyl methacrylate. Further examples of useful monomers include the partial esters of unsaturated aliphatic dicarboxylic acids and particularly the alkyl half esters of such acids. Examples of such partial esters are the alkyl half esters of itaconic acid, fumaric acid and maleic acid wherein the alkyl group contains 1 to 6 carbon atoms. Representative members of this group of compounds include methyl acid itaconic, butyl acid itaconic, ethyl acid fumarate, butyl acid fumarate, and methyl acid maleate. Minor amounts of other comonomers, such as adhesion promoting comonomers, may also be used. These monomers may be copolymerized with acrylic monomers to yield the polymer.

Examples of alpha, beta-ethylenically unsaturated carboxylic acids which may also be useful as comonomers to prepare the polymer of the invention include acrylic acid, beta- acryloxypropionic acid and higher oligomers of acrylic acid and mixtures thereof, methacrylic acid, itaconic acid, aconitic acid, crotonic acid, citraconic acid, maleic acid, fumaric acid, alpha-chloroacrylic acid, cinnamic acid, mesaconic acid and mixtures thereof. In addition to monoethylenically unsaturated monomer, small proportions of ethylenically monomer having at least two sites of ethylenic unsaturation, that is, di- or multi-ethylenically unsaturated monomer, may be useful as a comonomer in preparing the polymer. For example, allyl methacrylate or divinyl benzene may be used. The initial latex polymer may be prepared from a monomer mixture containing from about 0.005 to 2 percent by weight, based on the weight of the total solids of the polymer, of monomer containing at least two sites of ethylenic unsaturation. However, it is preferred to employ a polymerizable compound that has two acrylamido groups and to employ no additional multi-ethylenically unsaturated monomers.

Further examples of additional monomers include butyl acrylate, methoxyethyl acrylate, butyl methacrylate, N,N-dimethylacrylamide, N,N-diethylacrylamide, N-acryloyl-morpholine, N-acryloyl-piperidine,glycidyl acrylate, 2-ethylhexyl acrylate, acrylic acid anilide, methacrylic acid anilide, chlorostyrene, methoxystyrene, chloromethylstyrene, 1-vinyl-2-methylimidazole, 1-vinyl-2-undecylimidazole, 1-vinyl-2-undecylimidazoline, N-vinylcarbazole, vinylbenzyl ether, vinylphenyl ether, methylene-bis-acrylamide, trimethylene-bis-acrylamide, hexamethylene-bis-acrylamide, N,N'-diacryloylpiperazine, m-phenylene-bis-acrylamide, p-phenylene-bis-acrylamide, ethylene glycol diacrylate, propylene glycol dimethacrylate, diethylene glycol diacrylate, polyethylene glycol diacrylate, bis(4-acryloxypolyethoxyphenyl)propane, 1,5-pentanediol diacrylate, neopentyl glycol diacrylate, 1,6-hexanediol acrylate, polypropylene glycol diacrylate, pentaerythritol triacrylate, trimethylolpropane triacrylate, pentaerythritol tetraacrylate, N-methylol-acrylamide, diacetone-acrylamide, triethylene glycol dimethacrylate, pentaerythritol tetra-allyl ether.

The composition may alternatively or additionally contain a reactive oligomer or polymer. Examples of useful reactive oligomers include low molecular weight polymers (e.g., about 1,000 to 25,000 g/mole) having polymerizable ethylenic unsaturation. Specific examples include maleic-fumaric unsaturated polyesters, acrylate-terminated polyesters (e.g. those described in U.S. Pat. No. Re 29,131 to Smith et al.) acrylic copolymers having pendant vinyl unsaturation (e.g. allyl acrylate/acrylic copolymers), epoxy acrylates, and polyurethane acrylates.

Examples of useful reactive polymers include graff polymerizable polyolefins, e.g., polyethylene, polypropylene, and ethylene/propylene copolymers, and polymers having polymerizable ethylenic unsaturation along the backbone, for example diene homopolymers or eopolymers (e.g., styrene-butadiene copolymers, cis-polybutadiene, and butadiene-acrylonitrile copolymers).

In addition to the polymerizable compound, the composition is preferably free of other emulsifying or dispersing agents. However, in certain embodiments, the composition may also contain an anionic, cationic or nonionic dispersing agent, using for example from about 0.05% to 10% by weight of dispersing agent on the weight of total monomers. Combinations of anionic and nonionic emulsifiers may also be used. High molecular weight polymers such as hydroxy ethyl cellulose, methyl cellulose and polyvinyl alcohol may be used as emulsion stabilizers and protective colloids, as may polyelectrolytes such as polyacrylic acid. Cationic dispersion agents include lauryl-pyridinium chlorides, cetyldimethyl amine acetate, and alkyldimethylbenzylammonium chlorides in which the alkyl group has from 8 to 18 carbon atoms. Anionic dispersing agents include, for example, the higher fatty alcohol sulfates, such as sodium lauryl sulfate, and the like; alkylaryl sulfonates such as sodium or potassium isopropylbenzene sulfonates or isopropyl napththalene sulfonates, and the like; alkali metal higher alkyl sulfosuccinates, such as sodium octyl sulfosuccinate, sodium N-methyl-N-palmitoyltaurate, sodium oleyl isothionate, and the like; and alkali metal salts of alkylarylpolyethoxyethanol sulfates or sulfonates, such as sodium tert-octylphenoxypolyethoxyethyl sulfate having 1 to 5 oxyethylene units, and the like.

Suitable additional non-ionic dispersing agents include alkylphenoxypolyethoxyethanols having alkyl groups of from about 7 to 18 carbon atoms and from about 6 to about 60 oxyethylene units, such as heptylphenoxypolyethoxyethanols, methyloctylphenoxypolyethoxyethanols, and the like; polyethoxyethanol derivatives of methylene-linked alkyl phenols; sulfur-containing agents such as those made by condensing from about 6 to about 60 moles of ethylene oxide with nonyl mercaptan, dodecyl mercaptan, and the like, or with alkylthiophenols wherein the alkyl groups contain from 6 to 16 carbon atoms; ethylene oxide derivatives of long-chained carboxylic acids, such as lauric acid, myristic acid, palmitic acid, oleic acid, and the like, or mixtures of acids such as those found in tall oil containing from 6 to 60 oxethylene units per molecule; analogous ethylene oxide condensates of long-chained alcohols such as octyl, decyl, lauryl, or cetyl alcohols, ethylene oxide derivative of etherified or esterified polyhydroxy compounds having a hydrophobic hydrocarbon chain, such as sorbitan monostearate containing from 6 to 60 oxethylene units; also, ethylene oxide condensates of long-chain or branched chain amines, such as dodecyl amine, hexadecyl amine, and octadecyl amine, containing from 6 to 60 oxyethylene units; block copolymers of ethylene oxide sections combined with one or more hydrophobic propylene oxide sections. Mixtures of alkyl benzenesulfonates and ethoxylated alkylphenols may be employed.

A polymerization initiator of the free radical type, such as ammonium or potassium persulfate, may be used alone or as the oxidizing component of a redox system, which also includes a reducing component such as potassium metabisulfite, sodium thiosulfate or sodium formaldehyde sulfoxylate. The reducing component is frequently referred to as an accelerator. The initiator and accelerator, commonly referred to as catalyst, catalyst system or redox system, may be used in proportion from about 0.01% or less to 3% each, based on the weight of monomers to be copolymerized. Examples of redox catalyst systems include t-butyl hydroperoxide/sodium formaldehyde sulfoxylate/Fe(II), and ammonium persulfate/sodium bisulfite/sodium hydrosulfite/ Fe(II). The polymerization temperature may be from room temperature to 90° C., or more, and may be optimized for the catalyst system employed, as is conventional. Emulsion polymerization may be seeded or unseeded.

Chain transfer agents including mercaptans, polymercaptans and polyhalogen compounds are sometimes desirable in the polymerization mixture to moderate polymer molecular weight. Examples of chain transfer agents which may be used include long chain alkyl mercaptans such as t-dodecyl mercaptans, alcohols such as isopropanol, isobutanol, lauryl alcohol or t-octyl alcohol, carbon tetrachloride, tetrachloroethylene and trichlorobromoethane. Generally from about 0 to 3% by weight, based on the weight of the monomer mixture, may be used.

The polymerization process may be a thermal or redox type; that is, free radicals may be generated solely by the thermal dissociation of an initiator species or a redox system may be used. A monomer emulsion containing all or some portion of the monomers to be polymerized may be prepared using the monomers, water and emulsifiers. A catalyst solution containing catalyst in water may be separately prepared. The monomer emulsion and catalyst solution may be co-fed into the polymerization vessel over the course of the emulsion polymerization. The reaction vessel itself may initially contain water. The reaction vessel may also additionally contain seed emulsion and further may additionally contain an initial charge of polymerization catalyst. The temperature of the reaction vessel during the emulsion polymerization may be controlled by cooling to remove heat generated by the polymerization reaction or by heating the reaction vessel. Several monomer emulsions may be simultaneously co-fed into the reaction vessel. When multiple monomer emulsions are co-fed, they may be of different monomer composition. The sequence and rates at which the diverse monomer emulsions are co-fed may be altered during the emulsion polymerization process. After addition of the monomer emulsion or emulsions has been completed, the polymerization reaction mixture may be chased (e.g. with t-butyl hydroperoxide and or sodium ascorbate) to minimize the concentrations of unreacted monomer and unreacted polymerization catalyst species. The pH of the contents of the reaction vessel may also be altered during the course of the emulsion polymerization process. Both thermal and redox polymerization processes may be employed.

The aqueous compositions can be used for a variety of applications, the most common application being a coating. Methods of coating and materials used in coatings are described in *Encyclopedia of Polymer Science and Engineering*, vol. 3, pp. 552–671 and supp. vol., pp. 53, 109 and 110 (John Wiley & Sons, Inc., New York, N.Y., 1985), the disclosure of which is incorporated by reference. The polymerizable compositions of this invention may also find use as a starting material for applications in addition to coatings. Particular examples include articles formed by the shaping (e.g. casting, molding, or extrusion) of polymeric materials, as well as binders (e.g. for pigments of printing inks, magnetic media, etc.), or by use of the composition as an adhesive or sealant.

The following examples will serve to further illustrate the invention, but should not be construed to limit the invention, unless expressly set forth in the appended claims. All parts, percentages, and ratios are by weight unless otherwise indicated in context.

EXAMPLES

EXAMPLE 1

The compound N-acrylamido-N'-(n-butyl phthaloyl)-piperazine was prepared by the following reaction scheme using the specific procedure set forth therebelow.

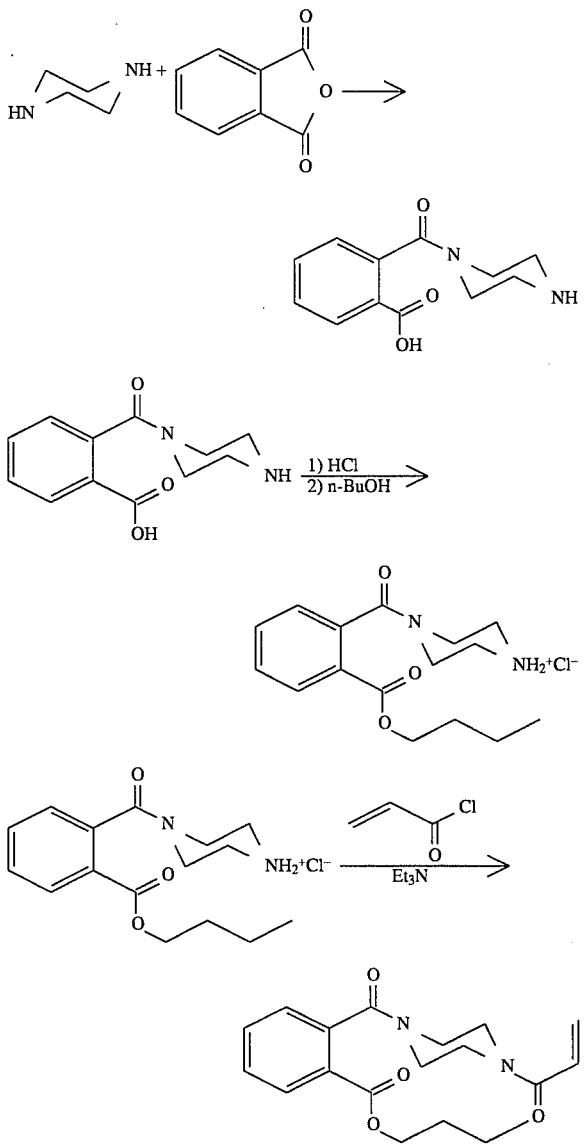

Procedure for the Synthesis of Phthalic Piperazine Amide Acid Into a 3 liter, four necked round bottom flask fitted with mechanical stirring, dry nitrogen and a reflux condenser were charged 129.2 grams piperazine, 750 ml dichloromethane, 750 ml acetonitrile, and 6.1 grams dimethylaminopyridine. To this mixture was added portion-wise 222.2 g phthalic anhydride. Following the addition, the mixture was refluxed for 3 hours, at the end of which period no residual anhydride was present by infrared analysis. The solvent was decanted from the solid product precipitate.

Procedure for the Synthesis of Phthalic Piperazine Amide Acid Butyl Ester

To the precipitated product from the previous procedure were added 150 ml 12N HCl, 200 ml n-butanol, and 7.1 g p-toluenesulfonic acid. A Dean-Stark trap was attached to the reflux condenser, and the reaction mixture was heated to reflux. The mixture was refluxed for 15 hours, at which time infrared analysis showed extensive conversion to the butyl ester, and TLC showed a single product using 1:1 methanol-water as eluent. The ester product was separated from the residual n-butanol by pressure filtration.

Procedure for the Synthesis Of Phthalic Piperazine Acrylamide Butyl Ester

Into a 3 liter, four necked round bottom flask fitted with a reflux condenser dry air, and mechanical stirring, were charged 324 g of the ester from the previous procedure, 500 ml acetonitrile, 250 ml dichloromethane, 253 g triethylamine, 3.0 g dimethylaminopyridine, and 0.21 g hydroquinone monomethyl ether. The mixture was cooled in an ice bath, and 100 g acryloyl chloride was added dropwise over a period of two and one half hours, with the addition rate sufficient to maintain a reaction temperature of 0°–10° C. The mixture was then allowed to warm to ambient temperature and stirred for an additional 90 minutes. The reaction mixture was then filtered through a Buchner funnel to remove undissolved solids. The resultant solution was washed with 1N HCl to remove unreacted triethylamine, dried with anhydrous sodium sulfate, and stripped of solvent under reduced pressure.

Example 2

The compound bis-(N'-acrylamido-piperazinyl) dimer acid amide was prepared by the following reaction scheme using the specific procedures set forth therebelow.

exotherm was noted, however significant bubbling was noted. Infrared spectroscopic analysis of the reaction mixture showed approximately 50% conversion to the acid chloride after 1 hour, with complete conversion after stirring the mixture overnight.

Procedure for the Synthesis of EMPOL 1008 Piperazine Amide

Into a 2 liter, 4-necked round bottom flask fitted with a Dean-Stark trap, reflux condenser, and mechanical stirrer were charged 1000 ml toluene, 152.3 grams piperazine, and 134.4 grams potassium carbonate. The mixture was refluxed for 30 minutes to dry the reactants. The reaction mixture was then cooled to 1° C. in an ice bath, and 250 ml dichloromethane was added to aid stirring. The Empol 1008 acid chloride was added dropwise through an addition funnel at a rate sufficient to maintain a reactant temperature of 10°–15° C. Following the addition, the mixture was allowed to warm to ambient temperature and stirred overnight. This material was then immediately converted to the acrylamide.

Procedure for the Synthesis Of EMPOL 1008 Piperazine Acrylamide

To the stirred reaction flask of the previous procedure was added 201.5 grams potassium carbonate. The reaction mixture was cooled in an ice bath to 12 C, and 132.0 grams acryloyl chloride was added dropwise over a period of 1 hour, maintaining a reactant temperature of 8°–10° C. The reaction mixture was pressure filtered through Celite to remove insoluble salts.

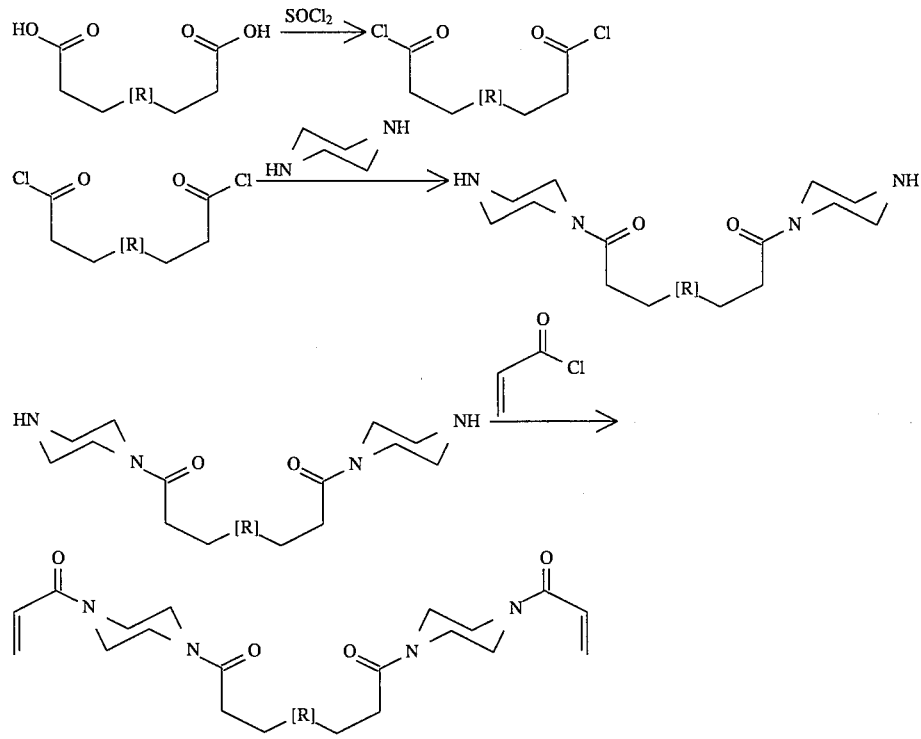

Procedure for the Synthesis of EMPOL 1008 Acid Chloride

Into a 1 liter, 4-necked round bottom flask fitted with a magnetic stirrer, reflux condenser, thermometer, and dry nitrogen were charged 250.0 grams of EMPOL 1008 dimer acid, 250 ml hexane, and 2 ml dimethylformamide. To the stirred mixture was added 115.7 g thionyl chloride dropwise through an addition funnel over a period of 30 minutes. No Example 3

A compound was prepared by the same (or substantially similar) procedure of Example 2, with the exception that dodecanedioic acid was employed to prepare a compound in accordance with scheme 3 wherein $R^8$ is the divalent alkylene radical having the formula $—(CH_2)_{10}—$.

Example 4

A compound was prepared by the same (or substantially similar) procedure of Example 2, with the exception that adipic acid was employed to prepare a compound in accordance with scheme 3 wherein $R^8$ is the divalent alkylene radical having the formula $-(CH_2)_4-$.

Example 5

Alternate Procedure for the Synthesis of EMPOL 1008 Piperazine Amide

Into a flask fitted with a distillation head and mechanical stirrer were charged 459.8 grams of Empol 1008 dimer acid, 12 ml of water and 4 drops of an inert anti-foam (from Dow Chemical). To this mixture was added 140.2 grams piperazine (a molar ratio of piperazine to dimer acid of about 2:1). The resulting mixture was heated to 126° C. over about 25 minutes and then to about 160° C. over about 65 minutes and held at about 160° C. for about 15 minutes. Then 4 drops of 85% phosphoric acid was added and the mixture was held at about 160° C. for one hour. After one hour, 36 ml of water had distilled over. Infra-red analysis of the mixture showed a residual carboxylate peak. The mixture was heated to 175° C. and held over about 70 minutes after which the infra-red analysis still showed a very small carboxylate peak. The mixture was heated to 200° C. and held over about 130 minutes after which the infra-red analysis showed no remaining carboxylate.

Example 6

Synthesis of a Diester of Polybutyleneoxy glycol with

N'-Acryloyl-N-(n-octenylsuccinoyl)piperazine

A compound having the following formula was prepared:

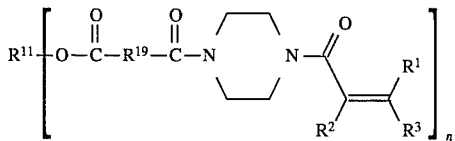

wherein $R^{11}$ is the residue of an alpha,omega-butyleneoxy glycol, $R^{19}$ is the residue of n-octenylsuccinic anhydride, n is 2 and $R^1$, $R^2$, and $R^3$ are all hydrogen.

Into a 1 liter resin kettle fitted with mechanical stirrer and dry nitrogen gas were charged 250.0 grams of a polybutyleneoxy glycol (available from Dow Chemical, Midland, Mich., as B100–1000 and having a molecular weight of about 1000 g/mole) 105.2 grams of n-octenylsuccinic anhydride, and 3.5 grams dimethylaminopyridine. The reaction mixture was heated to 100° C. until the anhydride was completely reacted as determined by infrared analysis. The resulting diacid compound was then reacted with piperazine as set forth in the alternate procedure for the synthesis of EMPOL 1008 piperazine amide and the product was then converted to a diacrylamide compound by reaction with acryloyl chloride.

Example 7

A pre-emulsion is prepared by mixing 1.5 gram of the product of Example 2 with 42.0 grams of vinyl acetate, 7.0 grams of butyl acrylate, and 100.0 grams of deionized water. The pre-emulsion was mixed with an additional 110.0 grams of deionized water and 0.5 grams of ammonium persulfate and the mixture was heated to 78° C. for a time sufficient to result in a latex dispersion. The latex dispersion exhibited acceptable stability.

What is claimed is:

1. An aqueous composition comprised of a major amount of water and a minor amount of a polymerizable compound having the formula:

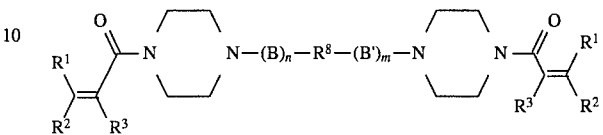

wherein each $R^1$, $R^2$, $R^3$ is independently selected from the group consisting of hydrogen and lower alkyl, each B and B' linking group is independently selected from the group consisting of carbonyl, sulfonyl, amide, and carboxyl;

n and m are independently one or zero;

$R^8$ is a divalent radical selected from the group consisting of an aliphatic group, an alicyclic group, an aromatic group, and a heterocyclic group.

2. A composition of claim 1 wherein $R^8$ has from 5 to about 50 carbon atoms and is selected from the group consisting of a higher alkylene group, a substituted higher alkylene group, an aryl group, an aralkyl group, and an alkaryl group.

3. An aqueous composition comprised of a major amount of water and a minor amount of a polymerizable compound represented by the formula:

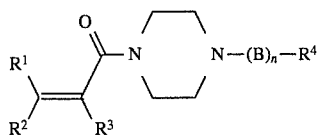

wherein:

$R^1$, $R^2$, and $R^3$ are each indeaendently selected from the group consisting of hydrogen and lower alkyl, B is a linking proud selected from the proud consisting of carbonyl, sulfonyl, amide, and carboxyl;

n is one or zero;

$R^4$ has the formula:

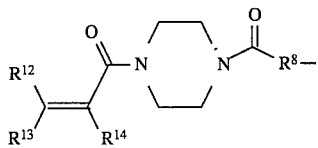

wherein $R^8$ is a divalent group selected from the group consisting of a higher alkylene group, a substituted higher alkylene group, an aromatic group, and a substituted aromatic group, and $R^{12}$, $R^{13}$, and $R^{14}$ are independently selected from the group consisting of hydrogen and lower alkyl.

4. A composition of claim 3 wherein $R^{12}$, $R^{13}$, and $R^{14}$ are hydrogen and $R^8$ is an alkylene radical selected from the group consisting of unsubstituted, straight chain alkylene radicals and alkylene radicals derived from dimer acids.

5. An aqueous composition comprised of a major amount of water and a minor amount of a polymerizable compound having the formula:

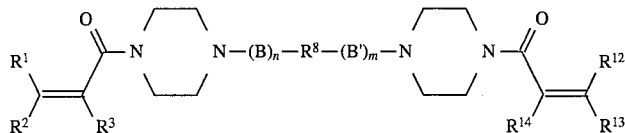

wherein each $R^1$, $R^2$, $R^3$, $R^{12}$, $R^{13}$, and $R^{14}$ is independently selected from the group consisting of hydrogen and lower alkyl, each B and B' linking group is a carbonyl group;

n and m are each one;

$R^8$ is a divalent radical selected from the group consisting of an aliphatic group.

6. An aqueous composition of claim 5 wherein $R^8$ has from 5 to about 50 carbon atoms and is selected from the group consisting of a higher alkylene group and a substituted higher alkylene group.

7. An aqueous composition of claim 5 wherein $R^8$ is an alkylene radical selected from the group consisting of unsubstituted, straight chain alkylene radicals and alkylene radicals derived from dimer acids.

8. An aqueous composition of claim 5 wherein $R^8$ is an alkylene radical derived from a dimer acid.

9. An aqueous composition comprised of a major amount of water and a minor amount of a polymerizable compound having the formula:

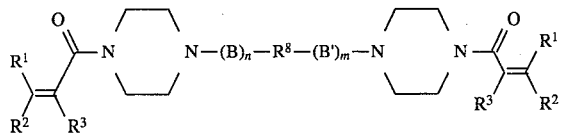

wherein each $R^1$, $R^2$, and $R^3$ is independently selected from the group consisting of hydrogen and lower alkyl, each B and B' linking group is a carbonyl group;

n and m are each one;

$R^8$ is a divalent radical derived from a dimer acid.

10. A composition of claim 1 wherein $R^8$ is a divalent group containing from 4 to 50 carbon atoms selected from the group consisting of alkylene, alkylene substituted with at least one member selected from the group consisting of halogen, nitro, trihalomethyl, sulfonic acid, $C_{1-10}$alkyl sulfonate ester, sulfoxide, sulfone, oxygen and sulfur; aryl, and aryl substituted with at least one member selected from the group consisting of alkyl, alkenyl, alkoxy, halogen, nitrogen, sulfur, oxygen, nitro, sulfonic acid, $C_{1-10}$alkyl sulfonate ester, sulfoxide and sulfone, cycloalkyl having from 4 to about 20 carbon atoms, unsaturated alkyl groups having 4 to about 40 carbon atoms, unsaturated cycloalkyl group having from 5 to 20 carbon atoms, straight chain or branched alkynyl groups having from 4 to about 30 carbon atoms and cycloalkynyl groups having from 6 to about 20 carbon atoms.

11. A composition of claim 1 wherein $R^8$ has at least 12 carbon atoms.

12. A composition of claim 11 wherein $R^8$ has no polar functional groups.

13. A composition of claim 3 wherein $R^8$ is a divalent group containing from 4 to 50 carbon atoms selected from the group consisting of alkylene, alkylene substituted with at least one member selected from the group consisting of halogen, nitro, trihalomethyl, sulfonic acid, $C_{1-10}$alkyl sulfonate ester, sulfoxide, sulfone, oxygen and sulfur; aryl, and aryl substituted with at least one member selected from the group consisting of alkyl, alkenyl, alkoxy, halogen, nitrogen, sulfur, oxygen, nitro, sulfonic acid, $C_{1-10}$alkyl sulfonate ester, sulfoxide and sulfone, cycloalkyl having from 4 to about 20 carbon atoms, unsaturated alkyl groups having 4 to about 40 carbon atoms, unsaturated cycloalkyl group having from 5 to 20 carbon atoms, straight chain or branched alkynyl groups having from 4 to about 30 carbon atoms and cycloalkynyl groups having from 6 to about 20 carbon atoms.

14. A composition of claim 3 wherein $R^8$ has at least 12 carbon atoms.

15. A composition of claim 14 wherein $R^8$ has no polar functional groups.

* * * * *